Figure 1:
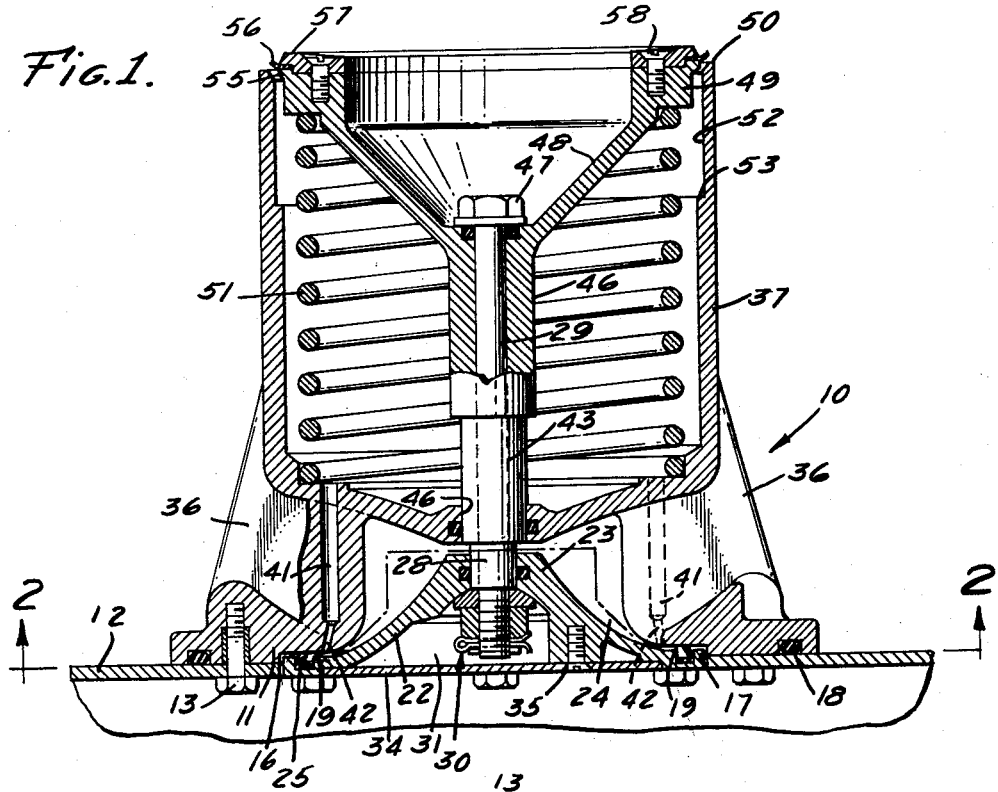

March 31, 1964     A. E. SWEATT ETAL     3,126,909

RELIEF VALVE

Filed Oct. 21, 1960

Albert E. Sweatt,
Nicholas Baskevitch,
INVENTORS.
WHANN & McMANIGAL
Attorneys for Applicants by United States Patent Office 3,126,909
Patented Mar. 31, 1964

3,126,909
RELIEF VALVE
Albert E. Sweatt, West Covina, and Nicholas Baskevitch, Hollywood, Calif., assignors to Schulz Tool and Manufacturing Co., San Gabriel, Calif., a corporation of California
Filed Oct. 21, 1960, Ser. No. 64,029
11 Claims. (Cl. 137—471)

This invention relates to a relief valve, and more particularly to a relief valve in which energy is recovered from the flow out of the valve when it is cracked to aid in fully opening it.

In light weight fuel tanks, such as those used in aircraft wings, it is important in order to prevent damage thereto that the relief valves open quickly at a predetermined pressure to permit a relatively large predetermined amount of fuel to flow therethrough. This means that the difference in the pressure between that required to crack the valve and that required to fully open it must be small. In the present invention this small difference in pressure between the cracking and the fully opening of the valve is accomplished by recovering energy from the fuel flow out of the valve and using it to aid in further opening the valve immediately after it is cracked.

It is an object of the invention to provide an improved relief valve.

It is another object of the invention to provide a relief valve that cracks at a predetermined pressure and that opens a substantial amount with a slight additional pressure over that required to crack the valve.

It is still another object of the invention to provide a relief valve in which a considerable amount of the energy required to open the valve beyond its cracked position is obtained from energy recovered from the fuel flow out of the valve.

It is a further object of the invention to provide a relief valve in which pressure is reduced on a spring biased means holding the valve in its normally closed position by the formation of a venturi adjacent the valve and its seat when the valve is cracked so as to aid in opening the valve beyond its cracked position.

It is a still further object of the invention to provide a relief valve having a cylinder containing a valve piston which is biased to hold the valve in its normally closed position, said cylinder having a continuous drain when the valve is closed. The purpose of this drain is to permit circulation of the fuel in and out of the cylinder and tank in which it is situated so that water in the fuel will not freeze and prevent the proper functioning of the valve.

Further objects and advantages of the invention may be brought out in the following part of the specification wherein small details have been described for the competence of disclosure without intending to limit the scope of the invention which is set forth in the appended claims.

Figure 2:
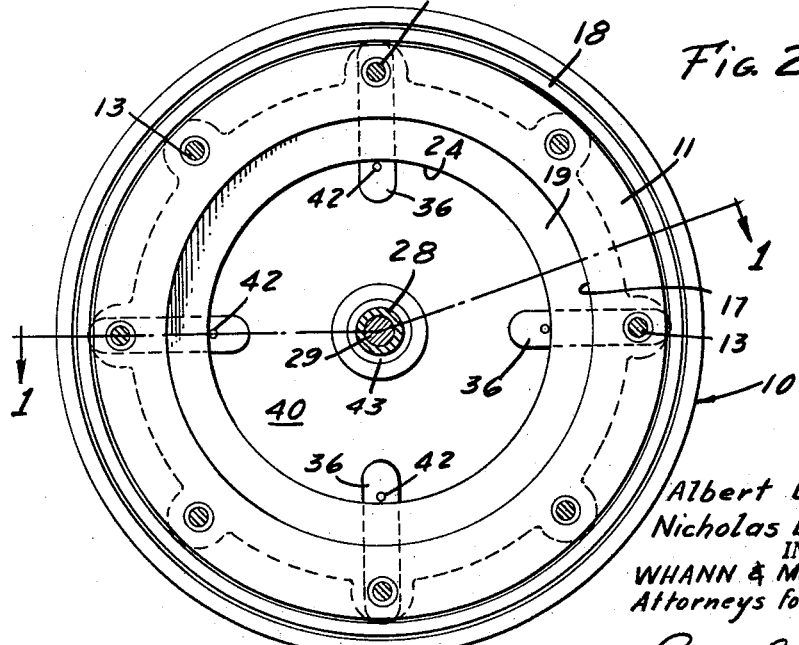

Referring to the accompanying drawings which are for illustrative purposes only:

FIG. 1 is a cross-sectional elevation view of a relief valve assembly according to the present invention shown secured to an outer wall surface of a tank taken as indicated by lines 1—1 of FIG. 2; and FIG. 2 is a plan view of the valve body with the valve removed taken along the lines 2—2 as indicated in FIG. 1.

Referring again to the drawings, in FIG. 1 is shown a poppet-type relief valve assembly 10 having an outwardly facing flange member 11 secured to the inner face of a wall 12 of a tank by means of screws 13. Such a tank may be typically used to carry fuel and may be located in the wing of an aircraft so that the outer surface of its wall 12 may also be the outer surface of the wing. Wall 12 has an opening 16 in alignment with an annular central recessed portion 17 in the flange 11. Outwardly of the screws 13 is an annular seal 18 disposed between the inner face of wall 12 and an annular recess in the face of the flange. On the outer surface in the recess 17 is an annular valve seat 19.

Poppet 22 has a generally frusto-conical configuration and is shown seated at 19 adjacent its annular periphery, having its smaller diameter portion 23 extending inwardly of opening 16 in the tank and central opening 24 in flange 11 inwardly of the valve seat. The seat seal is formed by an annular L-shaped lip member 25 which has its base portion fixed in an inwardly open recess in the inner face of the poppet 22.

The valve stem 28 is sealingly engaged in the inner small diameter end 23 of the poppet, this stem being held on the valve by a bolt 29 having secured on its outer end a nut, washer and locking assembly 30. Assembly 30 extends outwardly from the inner portion of the valve into its inner conical portion 31 which is closed by a cover plate 34 held in position by flat headed screws 35 so as to be substantially flush with the outer surface of wall 12 when the valve is closed.

Extending inwardly from the flange 11 are four circumferentially based inwardly directed webs 36, the latter being substantially perpendicular to the face of the flange. Supported on webs 36 is a valve piston chamber 37 having a substantially closed outer end 40.

Extending between the interior of chamber 37 and the outer surfaces of the webs, radially inwardly of seat 19, are passage means comprised of an inner large diameter portion 41 and an outer small diameter portion 42. The passages 42 are circumferentially spaced as may be best seen in FIG. 2, relatively to the poppet seat, so that when the valve is cracked open the fluid flow past the openings of the passages 42 has a venturi effect or stated differently, creates a suction within the passages and on the chamber 37.

Extending inwardly from stem portion 28 is an enlarged diameter stem portion 43 slidably and sealingly engaged in an opening 46 in end 40 of the piston chamber 37. Fitted on stem portion 43 is a stem continuation and piston supporting member 46, having at its outer end the head 47 of bolt 29, the latter being sealingly engaged with the member 46. Extending outwardly from member 46 is a conical body 48 which terminates in an annular piston 49 slidably engaged in open end 50 of chamber 37.

Surrounding stem portions 43 and 46 is coil spring 51 having one end in abutment with the inner surface of outer end 40 of the chamber and having its other end in abutment with the inner surface of piston 49 so as to bias the piston toward open end 50 and to hold poppet 22 on its seat against a predetermined pressure.

Inwardly of end 50 of chamber 37 is an enlarged inner diameter portion 52 terminating inwardly in shoulder 53. Piston 49 has an enlarged diameter end portion 55 of such size so as to be slidably engageable in enlarged diameter portion 52 and so as to provide a stop when poppet 22 is fully opened in that portion 55 moves into abutment with shoulder 53. When the valve is closed, portions 55 and 52 are spaced from each other to provide a drain for chamber 37 to permit circulation of the fuel therein so that the water in the fuel will not freeze around the piston and prevent the proper functioning of the valve. An annular lip seal 56, made from material such as Teflon, is secured in the end piston 49 to extend outwardly of its enlarged diameter portion by means of an annular ring 57 which in turn is held in place by means of screws 58. Seal 56 serves to completely close the end 50 of chamber 37 when the valve is cracked open and piston 49 moves into the chamber.

In operation, when an aircraft wing tank having a relief valve assembly 10 therein, is filled to its capacity and further filling would tend to apply excessive pressure on its walls such as 12, within a small range of pressures depending upon the predetermined design of the spring 51, the poppet 22 will be lifted off its seat in a cracked position with a small flow of fluid out of the opening 16 and over the ends of the passages 42. As this small amount of flow out of the valve in its cracked position is not sufficient to completely protect the tank against excessive pressure, means are provided in the present invention to fully open the valve with a small pressure differential between that required to crack it and that required to fully open it.

That is, as the valve is cracked off its seat piston 49 moves into enlarged diameter portion 53 of the chamber and the lip seal 56 and the piston completely close the chamber 37 from the tank. As the fluid flows past the open ends of passage 42 a suction is created therein so as to reduce the pressure within the chamber 37 to an amount sufficiently less than that in the tank so that the tank pressure, being exerted against the outer end of the piston will force the latter inward so as to cause the enlarged diameter portion 55 of the piston to move into abutment with shoulder 53 and fully open the valve to permit an adequate flow therethrough to completely protect the tank against excessive pressure. Stated differently, spring 51 is set so that when the pressure in chamber 37 is equal to the pressure in the tank externally of the chamber 37 the valve will be first cracked when the pressure on it exceeds the force of the spring. However, when the pressure is reduced in the chamber 37 after the piston seals its open end the suction through the passages 42 and 41 effectively recovers energy from the fluid flow so as to reduce the pressure in the chamber and thereby creates the differential pressure between the chamber and tank so that the pressure in the tank acts on the piston to fully open the valve.

While only one form of the invention has been shown and described, it is obvious that changes may be made thereto without affecting the essential characteristics of the invention as defined in the appended claims.

We claim:

1. In a valve assembly: a valve member; a seat for said valve member; means applying force to hold said valve member in a closed position on said seat, said valve member being liftable to a cracked position off its seat by pressure thereon in excess of said force holding it closed; and suction means laterally inwardly of the periphery of said seat and terminating approximately on the seat level upstream of said valve member and said seat to aid in further opening said valve member beyond its cracked position, said suction means being responsive to flow out of and around the valve member in its cracked position.

2. In a valve assembly: a valve member; a seat for said valve member; means applying force to hold said valve member in a closed position on said seat, said valve member being liftable to a cracked position off its seat by fluid pressure thereon in excess of said force holding it closed to permit fluid flow directly on said valve member; and means upstream of said valve member to obtain energy from said flow directly on said valve member in said cracked position, said valve member being associated with said last means to be responsive to said obtaining of said energy to further open said valve member.

3. In a valve assembly: a valve member; a valve seat; means biasing said valve member into a normally closed position on said seat, said valve member being liftable to a cracked position off its seat by a predetermined pressure thereon in excess of that of said biasing means; a chamber in said assembly; a stem secured at one end to said valve member and secured at its other end to a piston slidably engageable in said chamber, said stem extending through a wall of said chamber and being slidably and sealingly engaged therewith; and suction means upstream of said valve member connected to said chamber to reduce the pressure therein and on one side of said piston when said valve member is cracked and permitting flow therethrough, the other side of said piston at all times being subjected to substantially the same pressure as that on said valve member.

4. In a relief valve: a poppet valve; a valve seat; a piston chamber having an open end; a piston slidably engageable in said chamber; a stem connecting said poppet valve and said piston, said stem being slidably and sealingly engaged in a wall of said chamber opposite said open end; a spring in said chamber biasing said piston so as to hold said poppet valve on said seat; and suction means connected to said chamber to reduce the pressure therein when pressure on said poppet valve cracks said poppet valve to permit flow therethrough, said piston being adapted to be exposed to the same environment as but upstream of said poppet valve through said open end to tend to move said poppet valve in the opening direction when the poppet valve is cracked.

5. In a relief valve: a poppet valve; a valve seat; a piston chamber upstream of said poppet valve; a piston slidably engageable in said chamber; a stem connecting said poppet valve and said piston, said stem being slidably and sealingly engaged in a wall of said chamber; a spring in said chamber biasing said piston so as to hold said poppet valve on said seat; and suction passage means adjoining and upstream of said poppet valve and said seat connected to said chamber to reduce the pressure therein when said poppet valve is cracked to aid in further opening said poppet valve.

6. A relief valve comprising: a poppet valve; a body portion generally upstream of said poppet valve providing a seat therefor; a cylinder having an open end and being secured to said body portion; a piston slidably engageable in said cylinder; a stem connecting said poppet valve and said piston, said stem extending through a wall of said cylinder opposite said open end and being slidably and sealingly engaged in said wall; a spring in said cylinder biasing said piston so as to hold said poppet valve on said seat; at least one passage in said body portion and upstream of said poppet valve and seat connecting said cylinder to a flow path upstream of and adjacent said seat and said poppet valve, said flow path being formed when the poppet valve is cracked; and a cylinder drain formed between said cylinder adjacent its open end and said piston, said drain being closed by the movement of said piston when said poppet valve is cracked.

7. The invention according to claim 6 including means in said cylinder to limit the movement of said piston and the extent of the opening of said poppet valve.

8. A relief valve comprising: a poppet valve; a body portion generally upstream of said poppet valve providing a seat therefor; a cylinder secured to said body portion; a piston slidably engageable in said cylinder; a stem connecting said poppet valve and said piston, said stem extending through a wall of said cylinder and being slidably and sealingly engaged in said wall; a spring in said cylinder biasing said piston so as to hold said poppet valve on said seat; and at least one relatively narrow passage in said body portion and upstream of said poppet valve and said seat connecting said cylinder to a relatively narrow space between said poppet valve and said body portion upstream and adjacent said seat, said space being a flow path when said poppet valve is pressure cracked, said passage terminating at said space and said passage and said space being of predetermined sizes so that when said poppet valve is cracked by pressure thereon, the flow in said space creates a suction in said passage and in said cylinder.

9. A relief valve for a tank, comprising: a poppet valve adapted to form a portion of a wall of said tank and to close an opening therein when it is closed; a body portion generally upstream of said poppet valve providing a seat therefor, said body portion adapted to be secured within said tank, said body portion having an opening to register with said tank opening, said seat extending around the opening in the body portion; a cylinder secured to said body portion upstream of said poppet valve; a piston slidably engageable in said cylinder; a stem connecting said poppet valve and said piston, said stem extending through a wall of said cylinder and being slidably and sealingly engaged in said last wall; a spring in said cylinder biasing said piston so as to hold said poppet valve on said seat; a relatively narrow space immediately inwardly of and coextensive with said seat and between said body portion and said poppet valve forming a fluid flow path when said valve is cracked by pressure in said tank; and at least one relatively narrow passage in said body portion terminating in said space and connecting said cylinder to said flow path, said space when said poppet valve is cracked being of a predetermined size relative to said passage so that the fluid flow path in said space creates a suction in said passage and in said cylinder.

10. In a tank, a relief valve comprising: an opening through a wall of said tank; a poppet valve forming a portion of said wall of said tank to close said opening; a body portion generally upstream of said poppet valve and providing a seat therefor, said body portion being secured to and within said tank, said body portion having an opening in register with said tank opening, said seat extending around the opening in the body portion; a cylinder secured to said body portion upstream of said poppet valve; a piston slidably engageable in said cylinder; a stem connecting said poppet valve and said piston, said stem extending through a wall of said cylinder and being slidably and sealingly engaged in said last wall; a spring in said cylinder biasing said piston so as to hold said poppet valve on said seat; a relatively narrow space immediately inwardly of and coextensive with said seat and between said body portion and said poppet valve forming a fluid flow path when said valve is cracked by pressure in said tank; and at least one relatively narrow passage in said body portion terminating in said space and connecting said cylinder to said flow path, said space when said poppet valve is cracked being of a predetermined size relative to said passage so that the fluid flow path in said space creates a suction in said passage and in said cylinder.

11. The invention according to claim 10 in which said cylinder has an open end opposite said wall thereof; and a cylinder drain formed between said cylinder adjacent its open end and said piston, said drain being closed by the movement of said piston when said poppet valve is cracked.

References Cited in the file of this patent

UNITED STATES PATENTS

| | | |
|---|---|---|
| 1,685,866 | Raymond | Oct. 2, 1928 |
| 1,916,767 | Mason | July 4, 1933 |
| 2,043,453 | Vickers | June 9, 1936 |
| 2,069,522 | Flournoy | Feb. 2, 1937 |
| 2,225,880 | Montelius | Dec. 24, 1940 |
| 2,387,363 | Terry | Oct. 23, 1945 |
| 2,504,470 | Trautman | Apr. 18, 1950 |
| 2,577,851 | Hribar | Dec. 11, 1951 |
| 2,682,890 | May | July 6, 1954 |